United States Patent
Tachibana

(10) Patent No.: US 11,148,600 B2
(45) Date of Patent: Oct. 19, 2021

(54) STORAGE DEVICE FOR VEHICLE

(71) Applicant: NIFCO INC., Yokosuka (JP)

(72) Inventor: Norihide Tachibana, Yokosuka (JP)

(73) Assignee: NIFCO INC., Yokosuka (JP)

( * ) Notice: Subject to any disclaimer, the term of this patent is extended or adjusted under 35 U.S.C. 154(b) by 122 days.

(21) Appl. No.: 16/607,984

(22) PCT Filed: Apr. 18, 2018

(86) PCT No.: PCT/JP2018/016021
§ 371 (c)(1),
(2) Date: Oct. 24, 2019

(87) PCT Pub. No.: WO2018/198907
PCT Pub. Date: Nov. 1, 2018

(65) Prior Publication Data
US 2020/0317136 A1    Oct. 8, 2020

(30) Foreign Application Priority Data
Apr. 25, 2017  (JP) .............................. JP2017-085816

(51) Int. Cl.
*B60R 7/04*  (2006.01)
(52) U.S. Cl.
CPC ..................... *B60R 7/04* (2013.01)
(58) Field of Classification Search
CPC ... B60R 7/04; B60R 7/082; B60R 2011/0028; B60R 2011/0043
USPC ...................... 296/37.8, 37.7, 37.1
See application file for complete search history.

(56) References Cited

U.S. PATENT DOCUMENTS

| 6,216,930 | B1 * | 4/2001 | Plocher | B60R 7/082 224/539 |
| 2013/0193706 | A1 * | 8/2013 | Minelli | B60R 11/02 296/37.8 |
| 2017/0368998 | A1 * | 12/2017 | Arendsen | B60R 7/04 |
| 2020/0269741 | A1 * | 8/2020 | Koarai | B60R 7/06 |

FOREIGN PATENT DOCUMENTS

| EP | 2263916 A1 * | 12/2010 | ............ B60R 7/082 |
| JP | S60-193744 A | 10/1985 | |
| JP | S62-105035 U | 7/1987 | |
| JP | H07-300046 A | 11/1995 | |
| JP | 2007-176335 A | 7/2007 | |

OTHER PUBLICATIONS

PCT/ISA/210, "International Search Report for International Application No. PCT/JP2018/016021," dated Jun. 19, 2018.

* cited by examiner

*Primary Examiner* — D Glenn Dayoan
*Assistant Examiner* — E Turner Hicks
(74) *Attorney, Agent, or Firm* — Manabu Kanesaka

(57) ABSTRACT

A storage device for vehicle includes one member which can house an article on an inside; and another member attached to an outside of the one member in a state wherein at least one portion is superimposed. An essential portion includes a buffer material disposed inside the one member and can abut against the article to be housed therein, and the buffer material includes a portion sandwiched between the one member and the another member, and formed to extend from the buffer material.

9 Claims, 10 Drawing Sheets

STORAGE DEVICE FOR VEHICLE

RELATED APPLICATIONS

The present application is National Phase of International Application No. PCT/JP2018/016021 filed Apr. 18, 2018, and claims priority from Japanese Application No. 2017-085816, filed Apr. 25, 2017, the disclosure of which is hereby incorporated by reference herein in its entirety.

FIELD OF TECHNOLOGY

The present invention relates to a storage device for vehicle.

BACKGROUND ART

For a storage device for vehicle as a subject, there can be listed various console boxes provided inside a vehicle interior and a console lid opening and closing the console boxes, and furthermore, a cup holder for housing and holding cups, an eyeglasses holder for housing eyeglasses, and the like. FIGS. 10(a) and 10(b) show a console lid disclosed in Patent Document 1 as one example thereof, wherein FIG. 10(a) is a vertical cross-sectional view; and FIG. 10(b) is an enlarged view of essential parts. The console lid in FIGS. 10(a) and 10(b) is attached in a state wherein a lid inner (corresponding to one member of the present invention) 3 is superimposed relative to a lid outer (corresponding to the other member of the present invention) 1, and the console lid is assembled to be turnable and switchable between a closed state and an open state through a hinge relative to the console box (not shown in the drawings). Also, small articles can be housed and held in a concave portion on a lid-lower surface side in the open state. Also, in the lid inner 3, there is provided a lock member holding the closed state of the console lid relative to the console box.

Essential parts are such that an engagement piece 23a which is an engagement portion provided near the lock member in the lid inner 3; and a concave portion 25a which is a locking portion provided in the lid outer 1 and are locked so as to reinforce a periphery of the lock member and to prevent wobbling between members. Also, in the fitting structure, as shown in FIG. 10(b), there are provided slope portions 33 and 33 in a direction gradually approaching a concave-portion center line as moving to a back on an internal surface of the concave portion 25a which is the locking portion, and fitting between the engagement piece 23a and the slope portions 33 and 33 of the concave portion 25a is tightly sandwiched with a clamping pressure.

PRIOR ART DOCUMENT

Patent Document

Patent Document 1: Japanese Patent Application Publication No. H07-300046

SUMMARY OF THE INVENTION

Problems to be Solved by the Invention

The aforementioned Patent Document 1 explained such that there are provided the slope portions in the direction gradually approaching the concave-portion center line as moving to the back on the internal surface of the concave portion which is the locking portion, and the engagement piece is tightly sandwiched by a wedge function, so that temporal fixing and positioning, and furthermore, wobbling after fastening can be reliably prevented. However, in a case wherein the engagement piece fits in the slope portion on a concave-portion side, when respective portions of the lid outer and the lid inner are not formed accurately, the engagement piece cannot fit in the slope portion on the concave-portion side as designed. Also, a correction or tuning is difficult, and a dimensional error may cause the generation of an abnormal sound. Such problems become apparent in a structure of carrying out fitting between the engagement piece and the concave portion at a plurality of portions.

Incidentally, as another conventional wobbling preventive structure, a buffer material such as a non-woven fabric or the like is bonded or adhered to one member or the other member as well, however, the number of operations increases with the number of members so as to increase a cost.

Therefore, an object of the present invention is to provide an storage device for vehicle such that in a structure including a buffer material together with one member and the other member, tuning can be easily carried out using the buffer material, and wobbling is suppressed at a minimum cost. Other objects will be clarified in the following explanation.

Means for Solving the Problems

In order to obtain the aforementioned object, in one aspect of the present invention, a storage device for vehicle comprises one member which can house an article, and another member attached to an outside of the one member in a state wherein at least one portion is superimposed, and the storage device for vehicle includes a buffer material disposed inside the one member, which can abut against the article to be housed, and the buffer material includes a buffer portion sandwiched between the one member and the another member, and formed to extend at one portion.

In the aforementioned present invention, the buffer portion is a portion operating in such a way so as to eliminate a gap between members by being interposed between the one member and the another member and to prevent wobbling. Consequently, as the buffer material, a soft material such as rubber and the like is preferable, however, the buffer material is not limited to that. For example, the buffer material may be a non-woven fabric or a material similar to that.

The aforementioned present invention has the following aspects.

(1) The buffer material has a structure wherein in a state positioned and disposed inside one member, the buffer portion is disposed to project to the outside through an opening portion provided in the one member. In that aspect, in a structure wherein the buffer portion is disposed outside the opening portion provided in the one member, and can be sandwiched between the one member and the another member, the buffer portion can be easily disposed at an arbitrary portion of the one member so as to increase a degree of freedom for design.

(2) The buffer material has a structure wherein in a state positioned and disposed inside the one member, the buffer portion is disposed to project to the outside through a circumference end portion of the one member. In that aspect, in a structure wherein the buffer portion is disposed outside the circumference end portion of one member, and can be sandwiched between the one member and the other member, compared to the aspect described in (1), processing for the opening portion and the like in one member becomes unnecessary so as to easily provide the buffer material without a possibility of lowering rigidity.

(3) The buffer material is formed of an approximately flat shape including a corner portion, and has a structure wherein one portion of the corner portion of the buffer portion is chamfered. In that aspect, the buffer portion has the approximately flat shape including the corner portion so as to be easily formed, and a chamfering is provided in one portion of the corner portion so as to excellently carry out an arrangement or a positioning operation of the buffer portion in an inserting operation of the buffer material.

(4) The one member has a structure including a rib-shaped clamping projection for sandwiching the buffer portion between the one member and the other member. In that aspect, for example, compared to a structure clamped between both surfaces, the buffer portion can be reliably clamped so as to absorb the wobbling.

(5) The storage device for vehicle has a structure wherein relative to the one member, the another member is attached by an engagement between a convex portion and a concave portion. In that aspect, an assembly of the another member to the one member can be easily carried out, and additionally, the wobbling of both members is suppressed by the buffer portion so as to stably maintain engagement strength as well, and improve reliability.

(6) The storage device for vehicle has a structure wherein the one member is a case member including a storage space; the another member is an outer member disposed on an external surface portion of the case member; and the buffer material is a soft material such as the rubber and the like disposed in the storage space. In that aspect, as the storage device for vehicle receiving vibrations during driving, the storage device for vehicle becomes preferable for an eyeglasses holder, a cup holder, and the like wherein the article to be stored preferably abuts against the buffer material so as to absorb an impact.

Effect of the Invention

In the present invention, in a state wherein the one member and the another member are controlled or restricted so as not to wobble by the buffer portion interposed between the one member and the other member, the wobbling is suppressed. In the advantages, since the buffer portion may be sandwiched between both members, compared to the aforementioned Patent Document 1, a processing accuracy is moderated, and tuning can be easily carried out. Also, since the buffer portion for clamping may be added to the buffer material, the buffer material can be provided at a lower cost.

BRIEF DESCRIPTION OF THE DRAWINGS

FIGS. 1(a) and 1(b) are conceptual diagrams of an storage device for vehicle in which eyeglasses and the like are put according to an embodiment of the present invention, wherein FIG. 1(a) is a schematic side view showing a closed state of a holder; and FIG. 1(b) is a schematic side view showing an open state of the holder.

FIGS. 6(a) to 6(c) show a case member as a single item forming the aforementioned holder, wherein FIG. 6(a) is a front view; FIG. 6(b) is a top view; and FIG. 6(c) is a bottom view.

FIGS. 7(a) to 7(c) show an outer member as a single item forming the aforementioned holder, wherein FIG. 7(a) is a front view; FIG. 7(b) is a top view; and FIG. 7(c) is a bottom view.

FIGS. 8(a) to 8(c) show a buffer material as a single item forming the aforementioned holder, wherein FIG. 8(a) is a front view; FIG. 8(b) is a top view; and FIG. 8(c) is a bottom view.

FIGS. 9(a) and 9(b) show a modified example of the present invention, wherein FIG. 9(a) is a schematic half cross-sectional view showing a relationship of members; and FIG. 9(b) is a schematic half cross-sectional view showing an assembly completed state.

FIGS. 10(a) and 10(b) show a console lid which is a storage device disclosed in Patent Document 1, wherein FIG. 10(a) shows FIG. 4 in the Patent Document 1; and FIG. 10(b) shows FIG. 6 in the Patent Document 1.

BEST MODES OF CARRYING OUT THE INVENTION

Hereinafter, embodiments of the present invention will be explained with reference to attached drawings. In this explanation, after a device structure, an assembly, and an operation are described in detail, a modified example will be described. Incidentally, a storage device for vehicle as a subject of the present invention is not limited to a holder housing and holding eyeglasses and the like described in the embodiment, and can be provided as, for example, a cup holder, a console box, a console lid with a housing concave portion such as Patent Document 1, and further, a structure similar to the above.

Figure 1A:
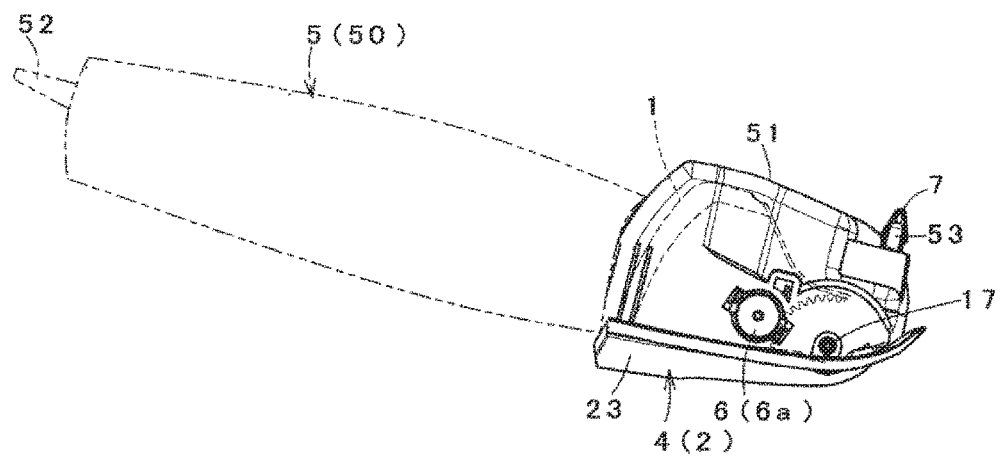
Figure 1B:
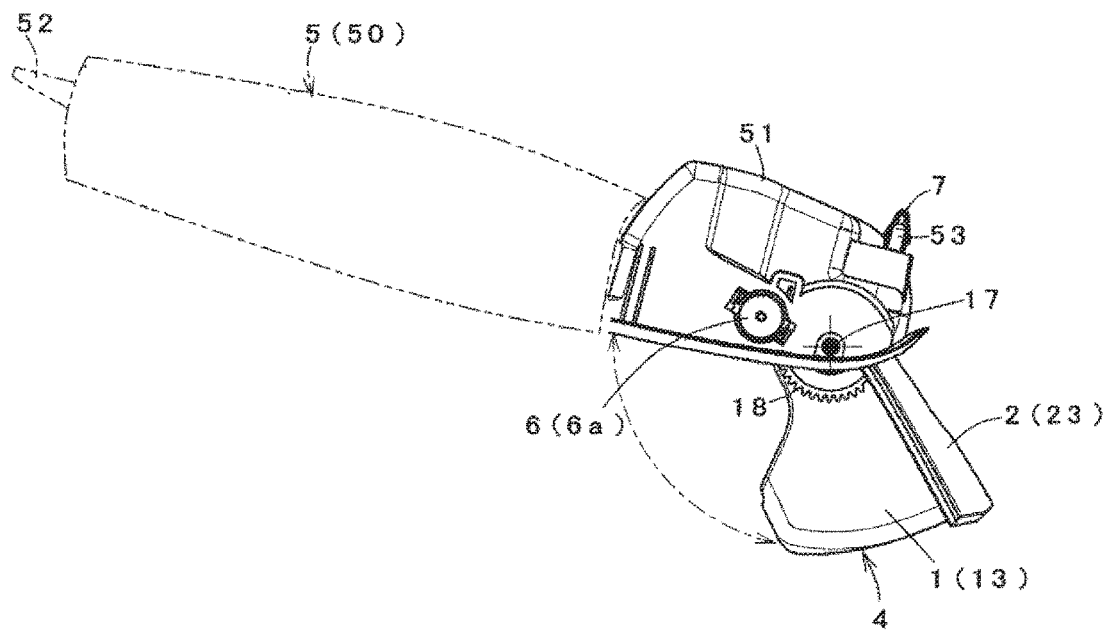
Figure 2:
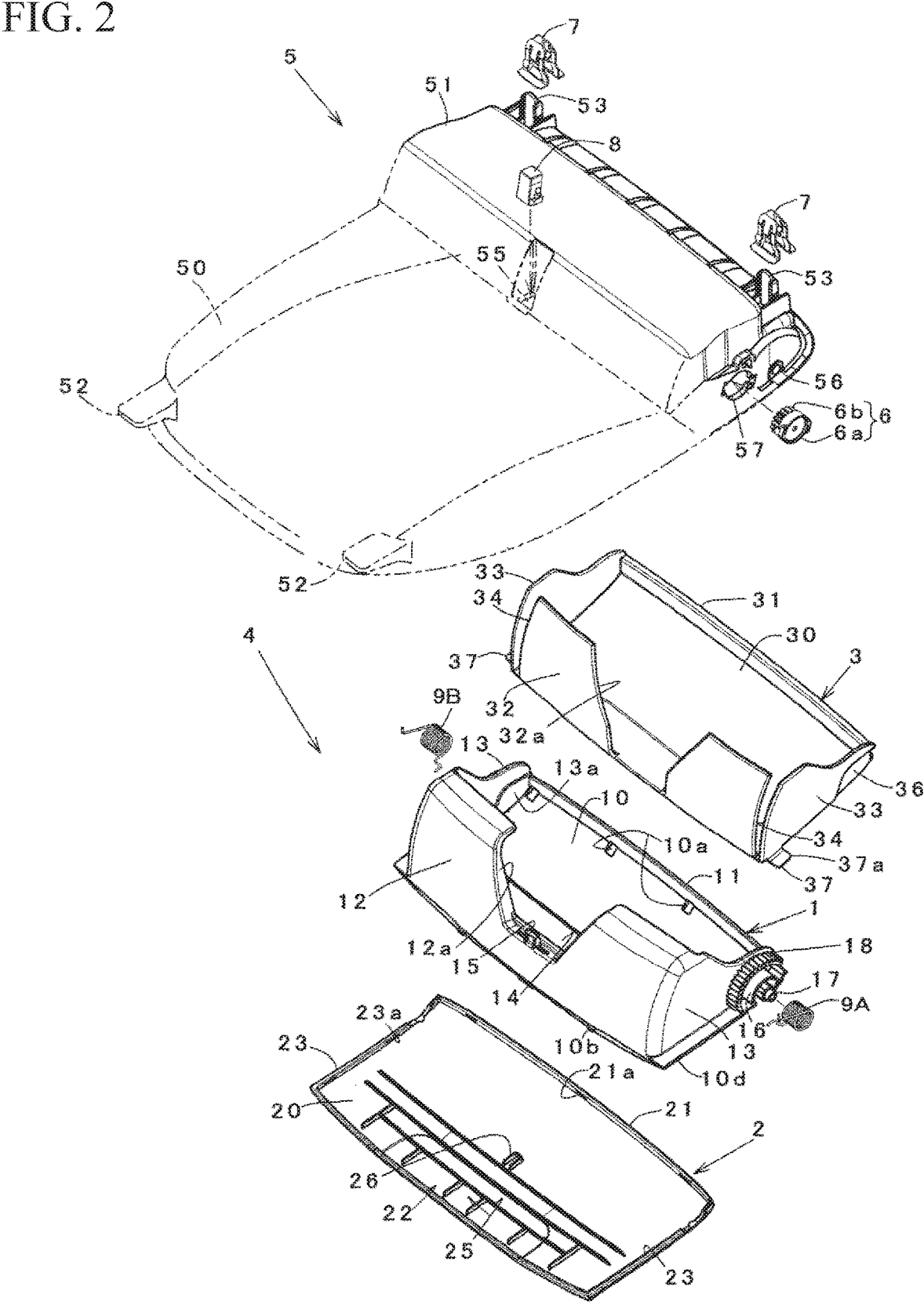
FIG. 2 is a schematic exploded perspective view showing a relationship of members of the aforementioned storage device.

(Device structure) As shown in FIGS. 1(a) and 1(b), and FIG. 2, the storage device for vehicle is an example wherein an article such as the eyeglasses and the like (not shown in the drawings) is stored, and a type wherein a holder 4 is switched between a storage position wherein the holder 4 is disposed on a surface approximately the same as that of a holder mounting portion 5 provided on a vehicle interior ceiling side as shown in FIG. 1(a), and a use position allowing the article to be put in and out by turning the holder 4 around a supporting point on shaft portions 17 and 17 on both sides as shown in FIG. 1(b).

First, the holder mounting portion 5 integrally is formed with an arrangement portion 51 having an inverted concave shape in a cross section where the holder 4 is put in and out on a front side of a main member 50 into which various devices are incorporated, and includes a pair of locking pieces 52 located on an external surface side and provided on both back sides; a pair of standing pieces 53 provided on both front sides and supporting clips 7 made of metal; and the like, and with using those, the holder mounting portion 5 is placed on the vehicle interior ceiling side.

Also, the arrangement portion 51 includes an attachment hole 55 positioned near a border line between the arrangement portion 51 and the main member 50, and provided in a middle of right and left; shaft holes 56 provided on a coaxial line on both side faces; an attachment hole 57 located on one side face, and provided on a near side of the shaft hole 56; and the like. In the attachment hole 55, there is placed a latch 8 which is a locking device. The shaft holes 56 turnably fit and pivot the shaft portions 17 on both sides provided in the holder 4, i.e. a case member 1. In the attachment hole 57, there is placed a damper 6 which is a braking device.

Among those, the holder 4 is pressed in a storage direction against an urging force of springs 9A and 9B, and releases the pressing force, so that the latch 8 locks the holder 4 (an engagement piece 15 provided in the case member forming the holder 4) and locks in the storage position. Also, the latch 8 is formed by a push-push type (for example, see Japanese Patent Application Publication No. 2007-308977 or Japanese Patent Application Publication No. 2013-116710) wherein when the holder is pressed in the storage direction again and releases the pressing force, the locking is released, and the holder 4 is switched to the use position by the urging force.

The damper 6 includes a main member 6a and a rotation gear 6b, and the like, and in a state positioned in the attachment hole 57, the damper 6 is attached by an engagement and the like. The damper 6 is formed by a known rotary-type oil damper and the like, and the rotation gear 6b is placed in an output shaft (not shown in the drawings) receiving a resistance of hydraulic oil. In an attachment state, the rotation gear 6b engages a gear portion 18 provided in the case member 1 forming the holder 4. Then, the damper 6 brakes such that the holder 4 gently turns when the holder 4 is switched from the storage position to the use position by the urging force.

Next, the holder 4 will be clarified. The holder 4 comprises the case member 1 forming a storage space allowing the article of an object (in the example, although the eyeglasses are used, other articles may be used) to be housed and held with a space; an outer member 2 attached to an outside of the case member 1 in a state wherein at least one portion is superimposed; and a buffer material 3 which can abut against the eyeglasses (not shown in the drawings) or the other articles to be disposed and housed inside the case member 1. The feature of the device especially resides in a structure wherein the buffer material 3 extends and forms buffer portions 37 at one portion (see FIG. 2 and FIG. 8(*c*)); a structure wherein the buffer portions 37 are disposed on an external surface side of the case member 1 through a case-side opening portion 14 or a circumference end portion (not shown in the drawings); a structure sandwiching the buffer portions 37 between the case member 1 and the outer member 2; and the like.

Figure 5A:
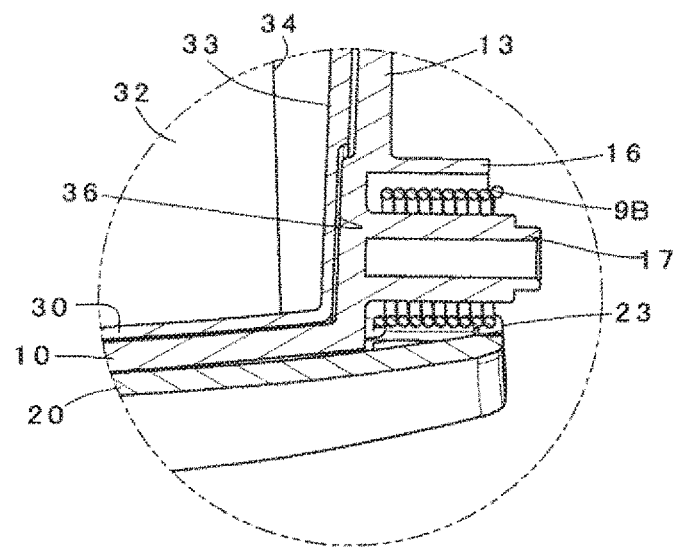
FIG. 5(a) is an enlarged view of a B1 portion in FIG. 4(a)
Figure 5B:
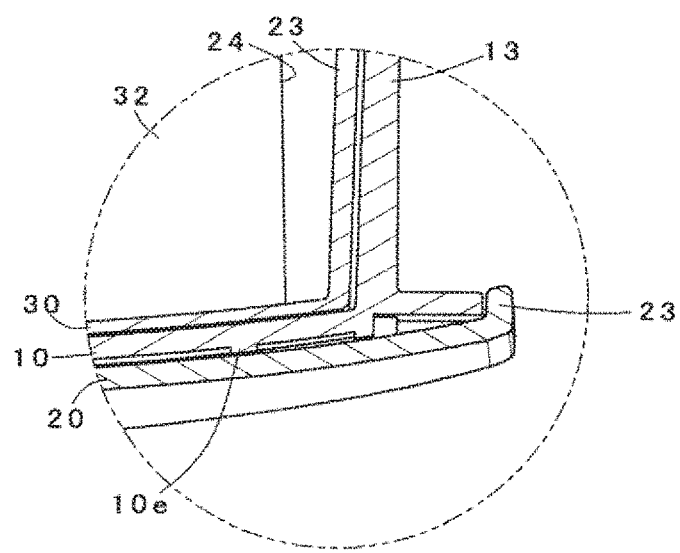
FIG. 5(b) is an enlarged view of a C1 portion in FIG. 4(b)

Here, the case member 1 and the outer member 2 are an injection-molded resin article, and the buffer material 3 is a rubber molded article. However, a material may be other materials. As shown in FIG. 2 and FIGS. 5(*a*) to 5(*c*), the case member 1 divides a housing space by a bottom wall 10 having approximately a rectangular plate shape; a front wall 11 and a back wall 12 provided to stand at a front edge and a back edge of the bottom wall 10; and side walls 13 and 13 provided to stand on an inside slightly more than both side edges of the bottom wall 10.

The bottom wall 10 is located between both side walls 13, and is notched in the rectangular opening portion 14 up to a near side of the back wall 12 from an approximately middle of front and back. The bottom wall 10 includes a plurality of hole portions 10a provided close to the front wall 11; a plurality of convex portions 10b provided on an end face on a back-wall 12 side, and projecting backward; a plurality of convex portions 10c provided on an end face on a front-wall 11 side, and projecting forward; a plurality of convex portions 10d provided on end faces on both sides, and projecting to left or right; a concave portion 14a provided in an approximate middle of right and left in a state communicating with the opening portion 14; many ribs 10e provided on an external surface; and among the ribs 10e, rib-shaped clamping projections 10f (see FIG. 5(*c*)) positioned at both corner portions on a back wall side by facing on right and left, and formed lower by one step.

Figure 6A:
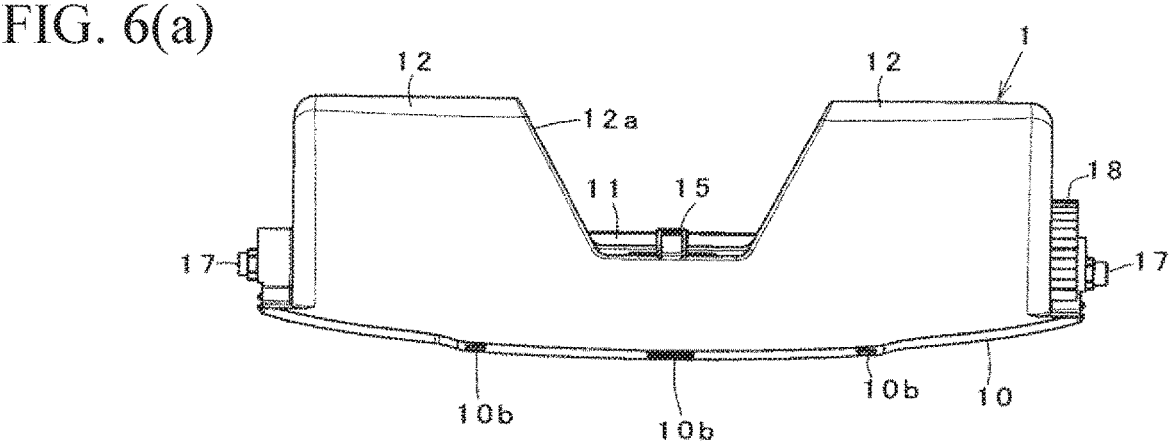
Figure 6B:
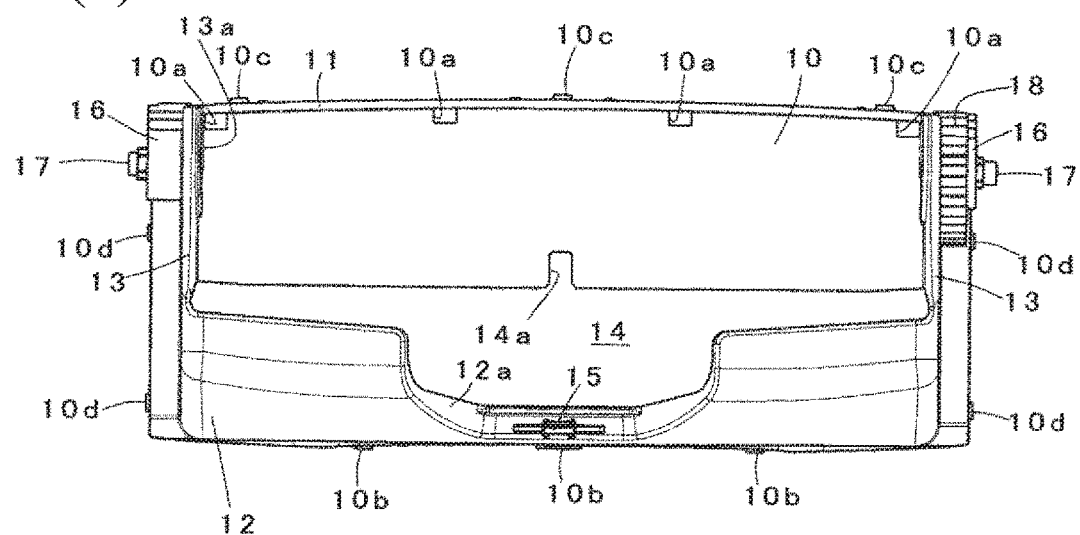
Figure 6C:
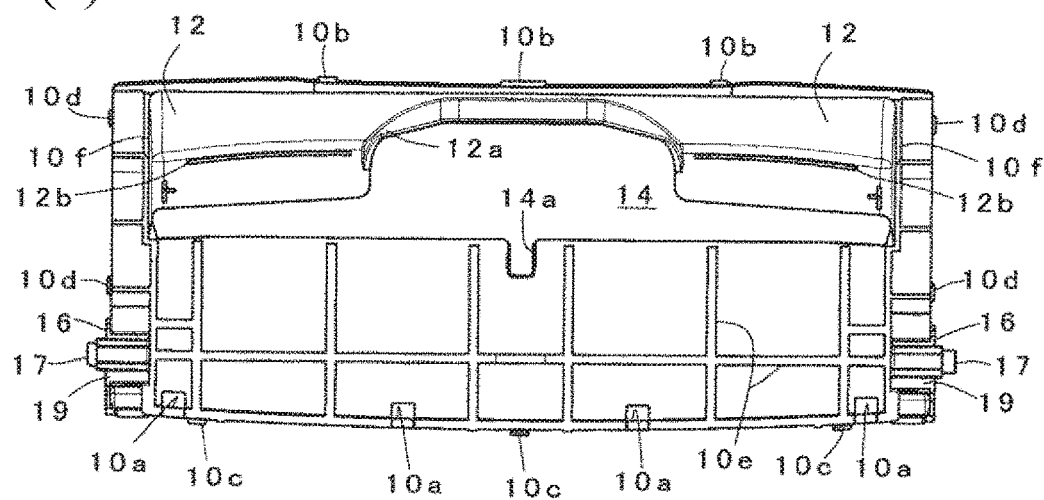

The back wall 12 is formed in a substantially high wall compared to the front wall 11, and a middle in right and left is notched in an inverted trapezoid-shaped opening 12a. An edge portion of the opening 12a becomes wider as moving from top to down, and includes the engagement piece 15 projected in a flat portion of a bottom portion. As shown in FIG. 6(*c*), on an internal surface of the back wall 12, there are projected ribs 12b on both sides sandwiching the opening 12a in a width direction.

The respective side walls 13 include arc-shaped portions 16 provided between side-edge sides of the bottom wall 10; the shaft portions 17 projecting in a center portion of each arc-shaped portion 16; and the arc-shaped gear portion 18 provided on an outside of one arc-shaped portion 16, and engaging the rotation gear 6b of the aforementioned damper. The shaft portions 17 on both sides are positioned on a coaxial line, and turnably fit in the shaft holes 56 provided on both sides of the arrangement portion 51 of the aforementioned holder mounting portion. Also, the coil-shaped springs 9A and 9B are disposed between the arc-shaped portion 16 and the shaft portion 17. Each of the springs 9A and 9B is assembled in a state wherein one end portion is locked in a hole portion (not shown in the drawings) provided in the arrangement portion 51, and the other end portion is locked in a latch portion provided near the arc-shaped portion 16 while providing the urging force, and urges the holder 4 in a direction of the use position. The reference symbol 13a represents a protruding portion located on an internal surface of each side wall 13 and provided on a front side.

Figure 7A:
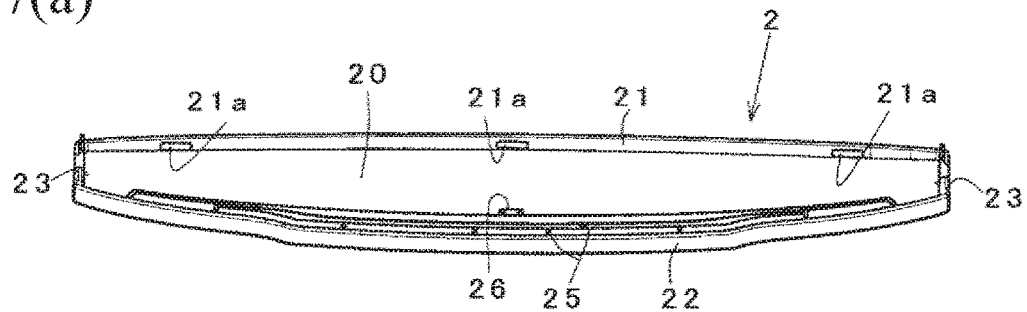
Figure 7B:
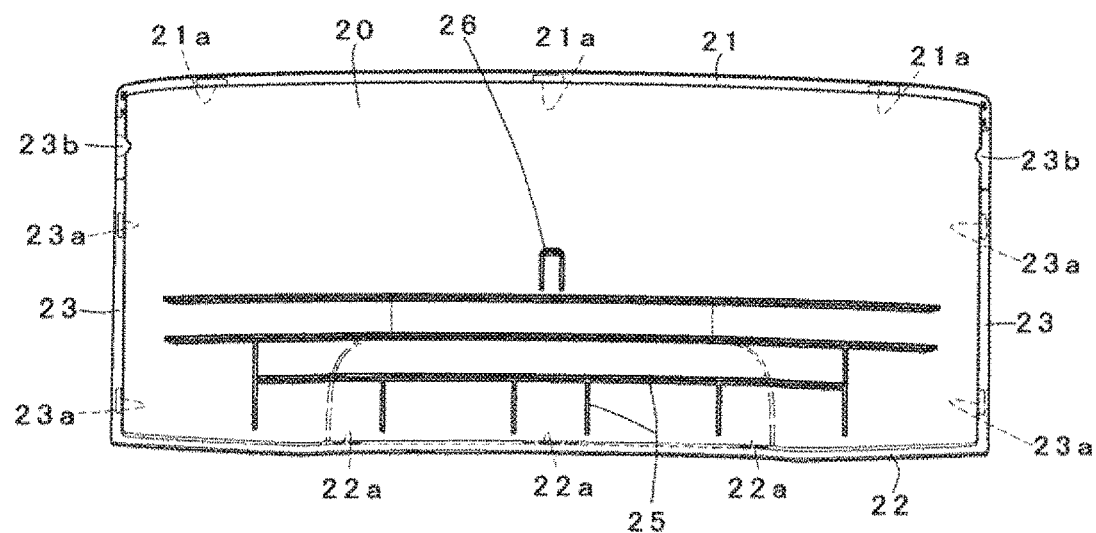
Figure 7C:
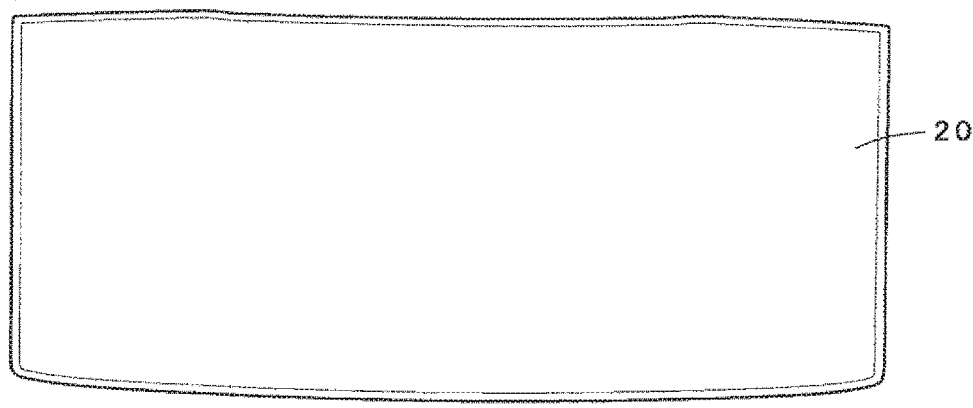

The outer member 2 is sometimes called a decorative plate as well, and as shown in FIG. 2 and FIGS. 7(*a*) to 7(*c*), the outer member 2 has an approximately rectangular shape covering the external surface of the bottom wall 10 of the case member, and is partitioned and formed by a bottom wall 20; a front wall 21 and a back wall 22 provided to stand at a front edge and a back edge of the bottom wall 20; and side walls 23 and 23 provided to stand on both edges of the bottom wall 20. In the front wall 21, there is provided a plurality of concave portions 21a engaging the corresponding convex portions 10c of the case member. In the back wall 22, there is provided a plurality of concave portions 22a engaging the corresponding convex portions 10b of the case member. In the respective side walls 23, there is provided a plurality of concave portions 23a engaging the corresponding convex portions 10d of the case member. Then, the outer member 2 is fixed relative to the case member 1 by respective engagements of the aforementioned four sides.

As mentioned above, in a state wherein the outer member 2 engages the case member 1, in the respective side walls 23, there are provided cavity portions 23b at portions facing the shaft portions 17 of the case member. Although the cavity portions 23b are portions where the springs 9A and 9B receive corresponding portions of the springs in a state wherein coil portions are supported in the shaft portions 17, however, the cavity portions 23b may be omitted. In an internal surface of the bottom wall 20, there are provided a plurality of ribs 25 extending in a width direction and a front-back direction between an approximately middle of front and back, and the back wall 22; and a single C-shaped rib 26 projected in a center. The ribs 25 are exposed in the opening portion 14 of the case member, and can receive a corresponding portion of the buffer material 3. The rib 26 can engage the concave portion 14a of the case member.

The buffer material 3 is assembled to an inside of the case member 1 so as to protect the eyeglasses and the like housed inside the case, and as shown in FIG. 2 and FIGS. 8(a) to 8(c), the buffer material 3 is partitioned and formed by a bottom wall 30 covering the bottom wall 10 and the opening portion 14 of the case member; a front wall 31 provided to stand in a front edge of the bottom wall 30, and disposed along an internal surface of the front wall 11 of the case member; a back wall 32 provided to stand at a back edge of the bottom wall 30, and disposed along the internal surface of the back wall 12 of the case member; and right and left side walls 33 and 33 provided to stand on both edges of the bottom wall 30, and disposed along the internal surface of the corresponding side walls 13 of the case member. Slits 34 are interposed between the back wall 32 and the respective side walls 33.

Figure 5C:
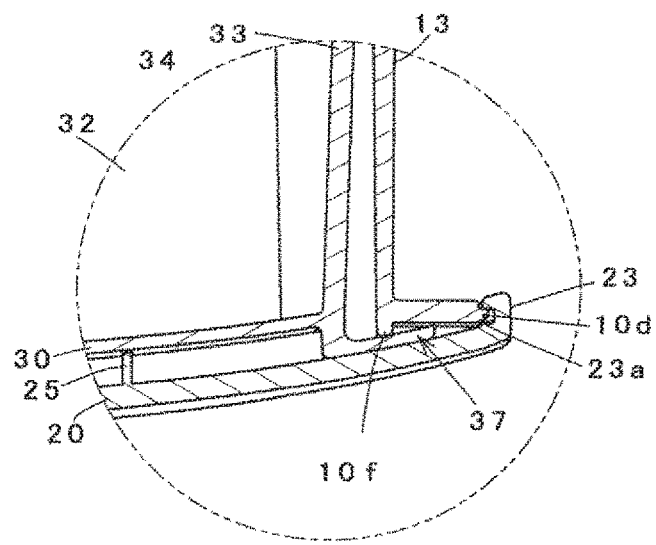
FIG. 5(c) is an enlarged cross-sectional view of a D1 portion in FIG. 4(c).

The bottom wall 30 includes a plurality of convex portions 35 provided along a reverse front edge; and the buffer portion 37 provided on a front side of both reverse side edges. The respective convex portions 35 engage the corresponding hole portions 10a of the case member. As shown in FIG. 5(c), the buffer portion 37 is formed in an approximately L shape in a cross section, and is clamped between the case member 1 and the outer member 2.

Figure 8A:
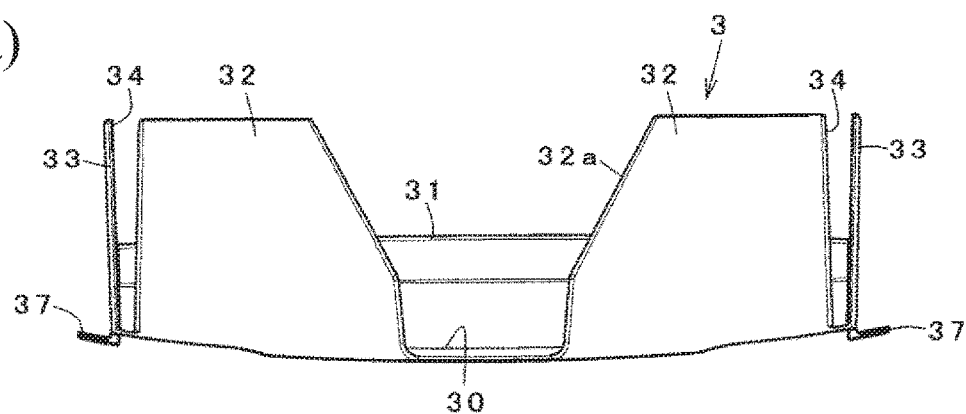
Figure 8B:
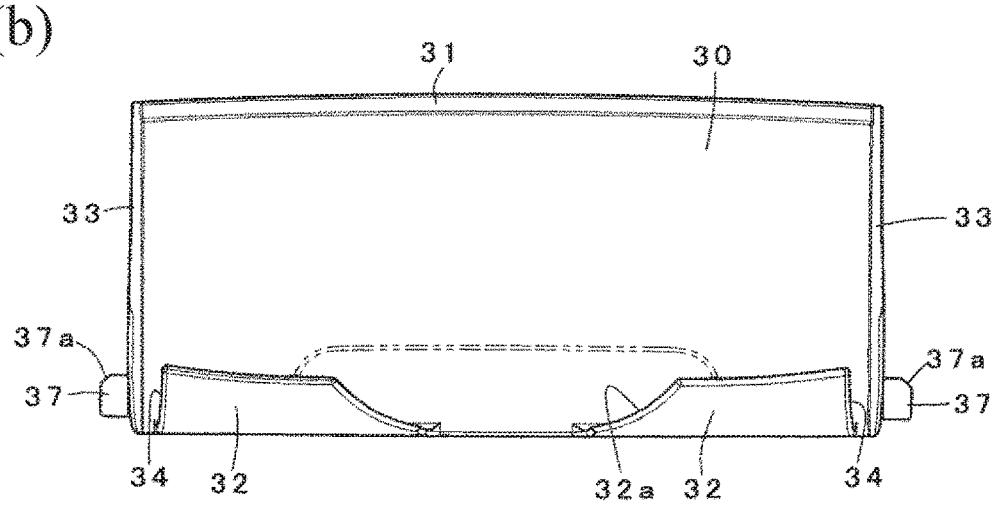
Figure 8C:
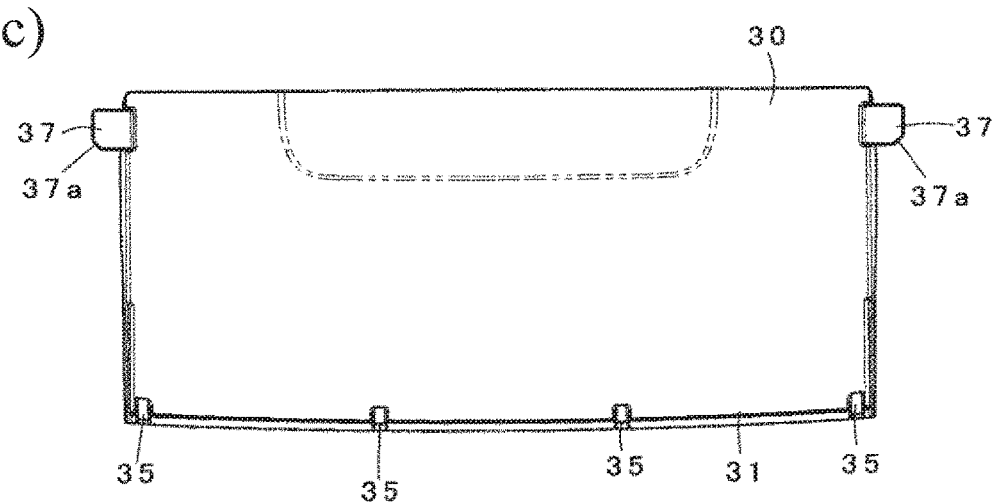

Namely, as shown in FIGS. 8(a) to 8(c), each buffer portion 37 projects in a left or right side direction of the bottom wall 30, and is clamped between the clamping projection 10f of the case member and a reverse-face corresponding portion of the outer-member-side bottom wall 20 so as to eliminate a gap between the case member 1 and the outer member 2 and prevent wobbling. Also, each buffer portion 37 has a rectangular shape, and includes a chamfering portion 37a wherein a corner portion on a front wall side is notched. In the back wall 32, there is provided an opening 32a corresponding to the opening 12a of the case member in a middle of right and left. On an external-surface front side of each side wall 33, there is provided a cavity portion 36 (see FIG. 2) engaging the protruding portion 13a on each case-member-side side wall.

(Assembly) The aforementioned case member 1, outer member 2, and buffer material 3 are assembled as the holder 4 in the following manner. First, the buffer material 3 is disposed inside the case member 1. In the operation, for example, the overall buffer material 3 enters into the case member 1 such that the back wall 32 is placed along an inside of the back wall 12, and the respective side walls 33 are placed on an inside of the corresponding side wall 13. At that time, the buffer portions 37 on both sides are disposed on an external surface side of the bottom wall 10 through the corresponding clamping projections 10f from the opening portion 14 of the case member, and the respective convex portions 35 engage the corresponding case-member-side hole portions 10a.

Thereby, the buffer material 3 is located inside the case member, and a position on a front-wall 31 side is controlled by an engagement between the hole portion 10a and the convex portion 35; positions on both side walls 33 are controlled by an engagement between the protruding portion 13a and the cavity portion 36, and a pressure contact of the buffer portion 37 relative to the clamping projection 10f, and the like; and a position of the back wall 32 is controlled by an abutment of both side portions of the opening 32a relative to an edging portion of the opening 12a, and an abutment of both upper sides relative to the ribs 12 on both sides so as to be integrally attached to an internal surface of the case member 1.

Figure 3A:
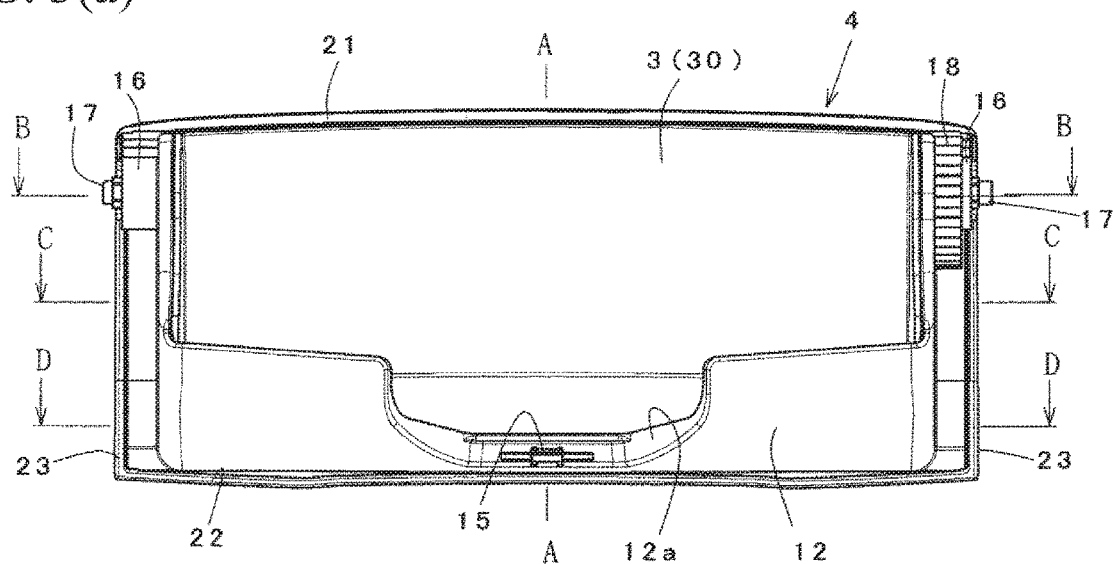
FIG. 3(a) is a top view of the holder.
Figure 3B:
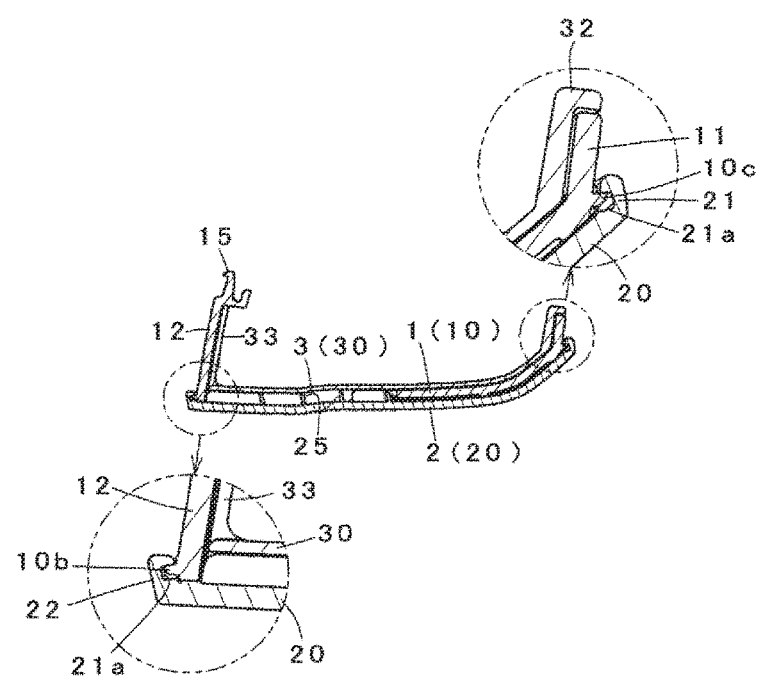
FIG. 3(b) is a cross-sectional view taken along line A-A in FIG. 3(a).
Figure 4A:
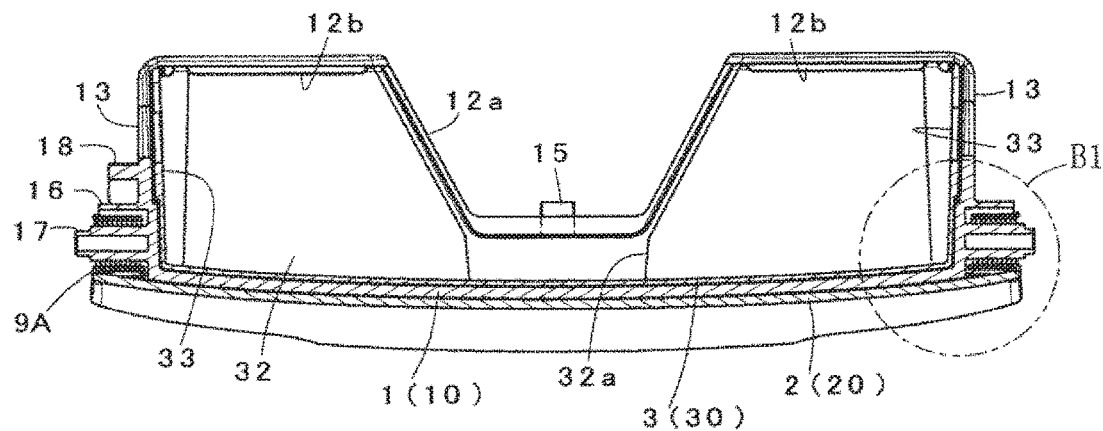
FIG. 4(a) is a cross-sectional view taken along line B-B in FIG. 3(a)
Figure 4B:
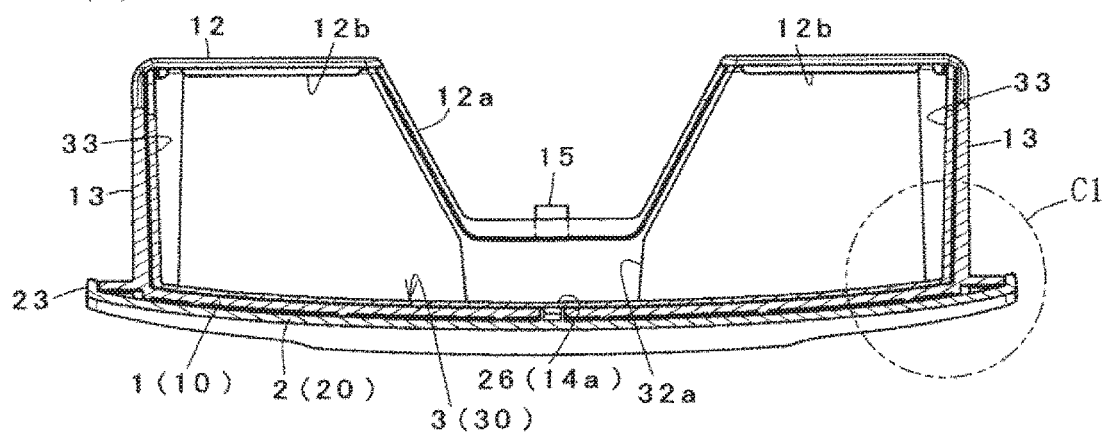
FIG. 4(b) is a cross-sectional view taken along line C-C in FIG. 3(a)
Figure 4C:
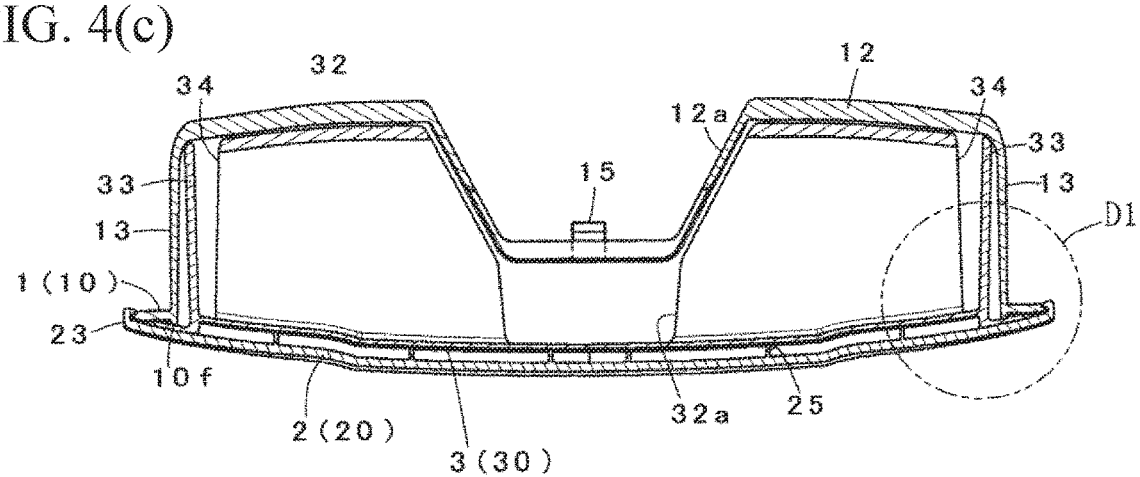
FIG. 4(c) is a cross-sectional view taken along line D-D in FIG. 3(a).

Next, the outer member 2 is disposed on an outside of the case-member-side bottom wall 10. In the operation, for example, in a state wherein the case-member-side bottom wall 10 is positioned relative to an inside of the front and back walls 21 and 22, and both side walls 23, the outer member 2 is pressed against a bottom-wall 10 side. Then, the outer member 2 is integrally attached to an external surface of the bottom wall 10 relative to the case member 1 by an engagement between the concave portion 21a of the front wall and the convex portion 10c, and an engagement of the concave portion 22a of the back wall and the convex portion 10b (see FIG. 3(b)), an engagement between the concave portion 23a on both side walls and the convex portion 10d (see FIG. 5(c)), and furthermore, an engagement between the convex portion 26 of the bottom wall and the concave portion 14a (see FIG. 4(b)).

(Operation) The holder according to the embodiment of the present invention formed in the aforementioned manner excels in the following respect in an assembly state.

(A) In the holder 4, in a structure wherein the case member includes the buffer material 3 disposed on the inside, which can abut against the article to be housed, first, since the article such as the eyeglasses and the like is located inside the case member 1, and is held in a state abutting against the buffer material 3, even when the holder 4 receives vibrations during driving, it becomes difficult to damage the article and the like so as to improve a housing characteristic. Also, the outer member 2 is controlled or restricted so as not to wobble relative to the case member 1 by the buffer portion 37 sandwiched between the bottom wall 10 and the bottom wall 20 even when the outer member 2 receives the vibrations during driving.

(B) In the aforementioned advantages, especially, since the buffer portion 37 may be sandwiched between both members, compared to the aforementioned Patent Document 1, a processing accuracy is moderated, and tuning can be easily carried out. Also, since the buffer portion 37 may be added to the buffer material 3, the buffer material 3 can be provided at a lower cost. Moreover, a structure wherein the outer member 2 is attached to the case member 1 by an engagement structure can suppress the wobbling of the engagement thereof as well so as to improve assembly strength and reliability.

(C) Additionally, in the structure, since the buffer portion 37 is arranged outside through the opening portion 14 provided in the case member 1, and can be sandwiched between the case member 1 and the outer member 2, the buffer portion 37 can be easily arranged at an arbitrary portion of the case member 1, i.e. in a design, in the vicinity of a portion where the case member 1 can most easily wobble. Moreover, since each buffer portion 37 is clamped between the rib-shaped clamping projection 10f on a case-member side and the internal surface of the flat bottom wall 20 on an outer-member side, compared to, for example, a structure clamped between both surfaces, the buffer portion 37 can be accurately clamped without any space so as to reliably prevent wobbling which can easily occur between the members.

(D) Also, in the structure, since each buffer portion 37 has a simple shape having the corner portion, the buffer portion can be easily formed, and by the chamfering portion 37a provided in one portion of the corner portion, an operation such as the positioning and the like can be carried out excellently when the buffer portion 37 is incorporated into a reverse side of the bottom wall 10 from a corresponding portion of the case-member-side opening portion 14.

(E) Obviously, since the outer member 2 is attached relative to the case-member-side bottom wall 10 mainly by engagements between the convex portions 10*b*, 10*c*, and 10*d*, and the concave portions 21*a*, 22*a*, and 23*a*, the assembly can be easily carried out. Additionally, the wobbling of both members is suppressed by providing the aforementioned buffer portion 37 so as to stably maintain engagement strength as well. Therefore, as a vehicle storage device, the storage device for vehicle becomes suitable for the vehicle storage device for an eyeglasses holder, for the cup holder, and the like wherein the article to be housed preferably abuts against the buffer material 3 so as to absorb an impact.

Figure 9A:
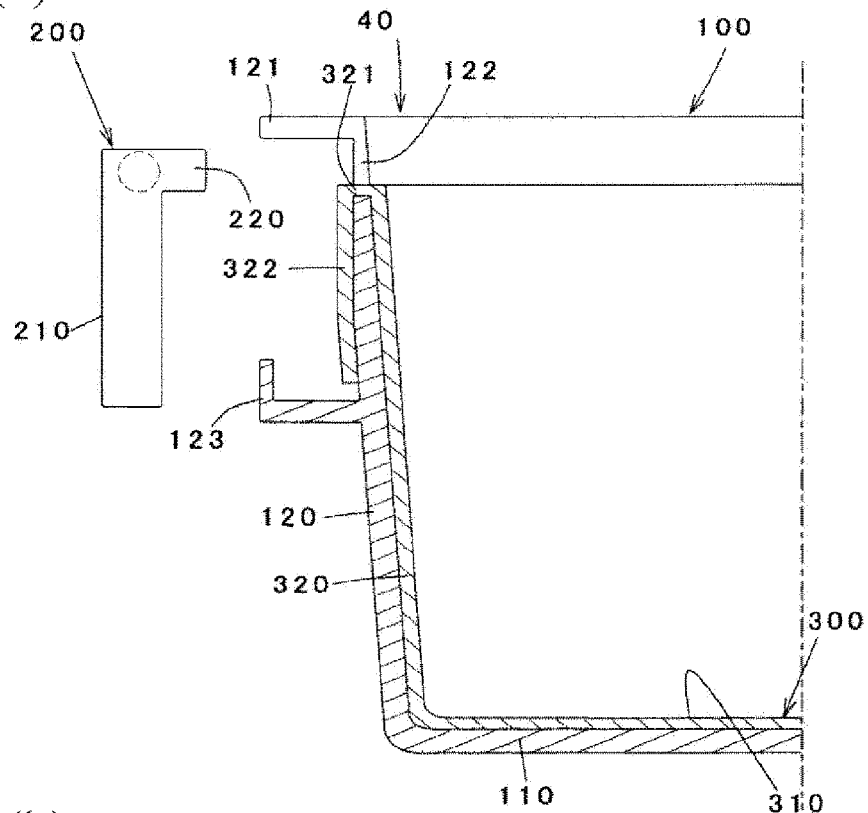
Figure 9B:
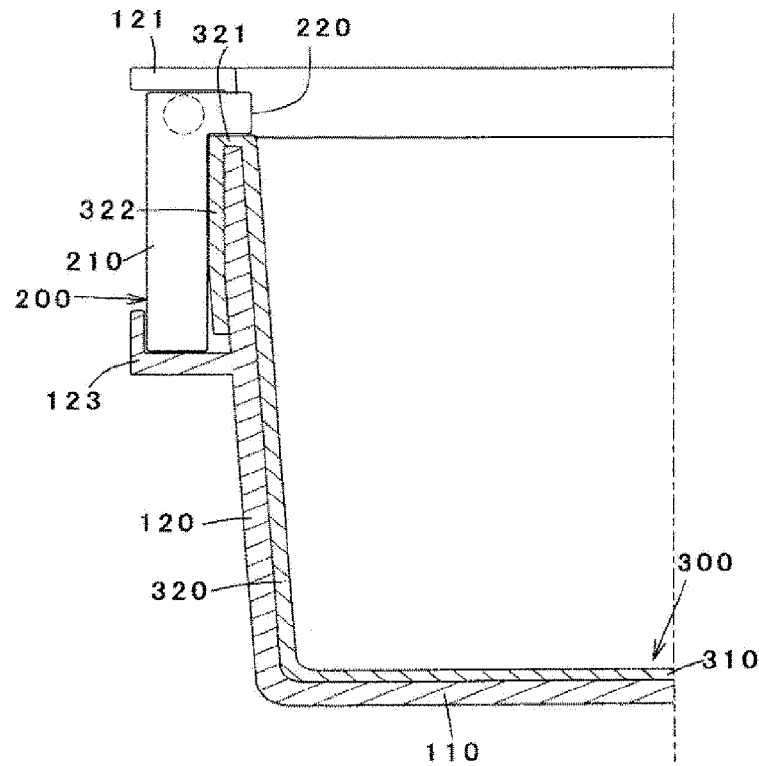
Figure 10A:
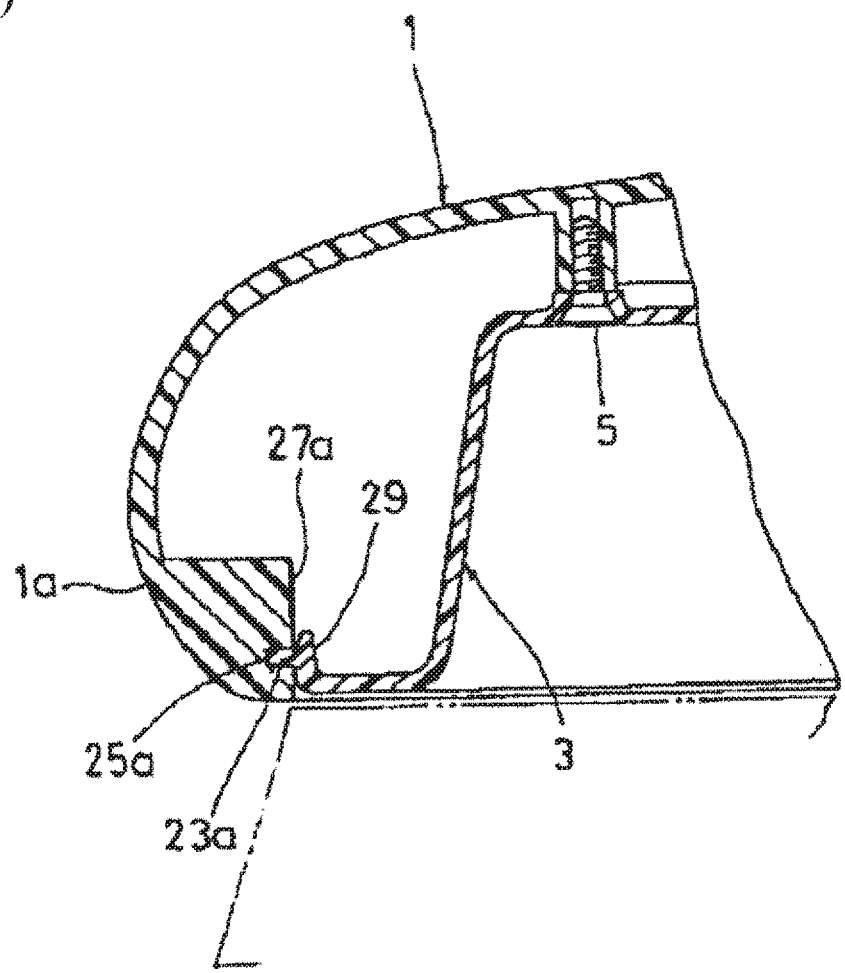
Figure 10B:
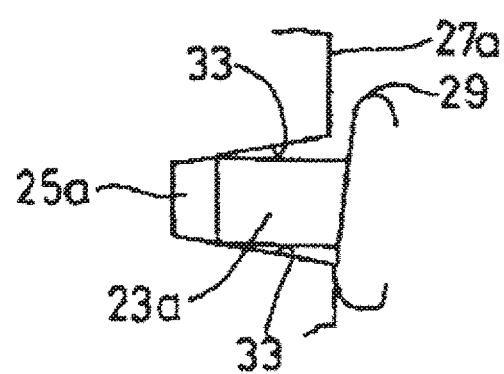

(Modified example) FIGS. 9(*a*) and 9(*b*) schematically show one example in a case wherein the present invention is applied to a cup holder 40 as the storage device for vehicle, wherein FIG. 9(*a*) shows a relationship of members; and FIG. 9(*b*) shows an assembly completed state. In the explanation, structures related to essential parts of the present invention will be clarified.

In the storage device for vehicle in FIGS. 9(*a*) and 9(*b*), in the cup holder 40, a case member 100 can house the article such as cups and the like on an inside, and the cup holder 40 includes an outer member 200 attached to an outside in a state wherein at least one portion is superimposed; and a buffer material 300 disposed on the inside of the case member 100, which can abut against the article to be housed therein. Incidentally, the outer member 200 is an example of a small light or a light source device. However, as the outer member 200, there may be, for example, a latch engaging and disengaging a lid (not shown in the drawings) or similar members as well.

Here, the case member 100 forms and divides a housing space for putting the cups in and out by a bottom wall 110 and a circumference wall 120. In the circumference wall 120, there is integrally provided an edging flange portion 121 around an outside of an upper end of the circumference wall 120, and a portion including one portion of the flange portion 121 is notched and forms an opening 122. The opening 122 has a size corresponding to a portion 220 irradiating a light from the light source device which is the outer member 200. Also, on an outer periphery surface of the circumference wall 120, there is provided a receiving portion 123 holding a main member 210 of the outer member 200. Although it is omitted in the drawings, in the receiving portion 123, there is provided a convex portion or a claw portion engaging a corresponding portion of the main member 210, and preventing the light source device from coming off.

The buffer material 300 includes a bottom wall 310 and a circumference wall 320, and has a shape fitting in an inside of the case member 100. Also, the buffer material 300 includes a buffer portion 322 bending through a bending portion 321 at one portion on an upper end side of the circumference wall 320, disposed on a circumference external surface side of the case member 100, and clamped between the case member 100 and the outer member 200. The buffer portion 322 is a portion for preventing wobbling by eliminating a gap between the members by being interposed between the case-member-side circumference wall 120 and the outer member 210.

In the aforementioned cup holder 40, as with the aforementioned holder 4, first, the cups are held in a state located inside the case member 100 to abut against the buffer material 300, so that even when the cups receive the vibrations during driving, the vibrations can be easily absorbed or moderated so as to improve a holding characteristic. Also, the light source device which is the outer member 200 is controlled or restricted so as not to wobble unexpectedly relative to the case member 100 by the buffer portion 322 sandwiched between the light source device and the circumference wall 120 even when the light source device receives the vibrations during driving so as to improve the reliability.

Incidentally, as mentioned above, details of the present invention can be modified or developed further in reference to the aforementioned embodiment or modified example provided that the modified or developed structure includes a structure specified in the invention. As an example thereof, although the holder mounting portion 5 of the embodiment is shown as an example placed on the vehicle interior ceiling side, there may be a structure placed on a center console, an instrument panel, and the like. Also, a specific embodiment or a shape of the case member 1 or 100, the outer member 2 or 200, and the buffer member or 300 forming the holder 4 or the cup holder 40 can be modified arbitrarily as needed.

EXPLANATION OF SYMBOLS

1 . . . a case member (corresponding to one member)
2 . . . an outer member (corresponding to the another member)
3 . . . a buffer material
4 . . . a holder
5 . . . a holder mounting portion
6 . . . a damper (6*a* is a main member, and 6*b* is a rotation gear.)
7 . . . clips
8 . . . a latch (a locking device)
9A . . . a spring (an urging device)
9B . . . a spring (the urging device)
37*a* . . . chamfering portions
37 . . . buffer portions
40 . . . a cup holder
100 . . . a case member (corresponding to one member)
200 . . . an outer member (corresponding to the another member)
300 . . . a buffer material
321 . . . a bending portion
322 . . . a buffer portion Incidentally, all contents of the specification, claims, drawings, and abstract of Japanese Patent Application No. 2017-085816 filed on Apr. 25, 2017 are cited in their entireties herein and are incorporated as a disclosure of the specification of the present invention.

What is claimed is:
1. A storage device for vehicle, comprising:
one member which can house an article on an inside;
another member attached to an outside of the one member such that at least one portion of the one member directly faces the another member; and
a buffer material which is disposed inside the one member opposite to the another member and which abuts against the article to be housed,
wherein the buffer material includes a buffer portion extending from the buffer material disposed inside the one member to the another member, the buffer portion being sandwiched between the one member and another member.

2. A storage device for vehicle according to claim 1, wherein the buffer portion is disposed to project to an outside through an opening portion provided in the one member in a state wherein the buffer material is positioned and disposed inside the one member.

3. A storage device for vehicle according to claim 1, wherein in a state wherein the buffer material is positioned and disposed inside the one member, the buffer portion is disposed to project to an outside through an upper end portion of the one member.

4. A storage device for vehicle according to claim 1, wherein the buffer material has an approximately flat shape including a corner portion, and one portion of a corner portion of the buffer portion is chamfered.

5. A storage device for vehicle according to claim 1, wherein the one member includes a rib-shaped clamping projection for sandwiching the buffer portion between the one member and the another member.

6. A storage device for vehicle according to claim 1, wherein relative to the one member, the another member is attached by an engagement between a convex portion and a concave portion.

7. A storage device for vehicle according to claim 1, wherein the one member is a case member including a storage space, the another member is an outer member disposed on an external surface portion of the case member, and the buffer material is a soft material disposed in the storage space.

8. A storage device for vehicle according to claim 1, wherein the one member includes a bottom wall, a back wall facing the bottom wall, and two side walls to sandwich the bottom wall and the back wall therebetween, the buffer material includes a bottom wall, a back wall and two side walls corresponding to the bottom wall, the back wall and the two side walls of the one member, respectively, and the buffer portion includes left and right portions extending from the bottom wall of the buffer material and disposed between the one member and the another member.

9. A storage device for vehicle according to claim 1, wherein the one member includes a bottom wall, and a circumference wall having a flange portion, the buffer material includes a bottom wall and a circumference wall corresponding to the bottom wall and the circumference wall of the one member, and a bending portion at the flange portion, and the buffer portion extends from the bending portion and is located between the circumference wall of the one member and an outer member as the another member.

\* \* \* \* \*